US006856982B1

(12) United States Patent
Stevens et al.

(10) Patent No.: US 6,856,982 B1
(45) Date of Patent: Feb. 15, 2005

(54) SYSTEM, INTELLIGENT NETWORK SERVICE ENGINE AND METHOD FOR DETECTING A FRAUDULENT CALL USING REAL TIME FRAUD MANAGEMENT TOOLS

(75) Inventors: Gilman R. Stevens, Fairview, TX (US); Babu V. Mani, Plano, TX (US)

(73) Assignee: Alcatel, Paris (FR)

( * ) Notice: Subject to any disclaimer, the term of this patent is extended or adjusted under 35 U.S.C. 154(b) by 704 days.

(21) Appl. No.: 09/795,246

(22) Filed: Feb. 26, 2001

(51) Int. Cl.[7] ............................................... G06N 5/02
(52) U.S. Cl. ......................................... 706/50; 379/114
(58) Field of Search ........................... 706/50; 379/114, 379/93, 188; 380/257

(56) References Cited

U.S. PATENT DOCUMENTS

| | | | | |
|---|---|---|---|---|
| 5,434,920 A | * | 7/1995 | Cox et al. ................ | 380/257 |
| 5,495,521 A | * | 2/1996 | Rangachar ............ | 379/93.04 |
| 5,566,234 A | * | 10/1996 | Reed et al. ............... | 379/188 |
| 5,907,602 A | * | 5/1999 | Peel et al. ................ | 379/114 |
| 6,320,947 B1 | * | 11/2001 | Joyce et al. ............. | 379/114.2 |

* cited by examiner

*Primary Examiner*—Wilbert L. Starks, Jr.
(74) *Attorney, Agent, or Firm*—William J. Tucker; Craig A. Hoersten; V. Lawrence Sewell

(57) ABSTRACT

A system, intelligent network service engine and method are described than can perform a real time fraud analysis on an originating side of a call stream to determine whether or not a call is a fraudulent call before the call is connected to a called party. In particular, the system includes a switch capable of receiving a call originated by a calling party and an intelligent network service engine capable receiving information (e.g., call origination data) about the call from the switch. The intelligent network service engine (e.g., home location register, service control point, INSight platform) then uses real time fraud management tools to analyze the call origination data to determine whether or not the call has a fraudulent attribute before the call is connected to a called party. The system can be configured as a wired communications network, a wireless communications network and/or an Internet network.

35 Claims, 5 Drawing Sheets

SYSTEM, INTELLIGENT NETWORK SERVICE ENGINE AND METHOD FOR DETECTING A FRAUDULENT CALL USING REAL TIME FRAUD MANAGEMENT TOOLS

CROSS REFERENCE TO RELATED APPLICATION

This application is related to U.S. patent application Ser. No. 09/795376 filed on Feb. 26, 2001 and entitled "SYSTEM, INTELLIGENT NETWORK SERVICE ENGINE AND METHOD FOR INFORMING MONITORING PERSONNEL ABOUT AN ONGOING FRAUDULENT CALL OR AN ATTEMPTED FRAUDULENT CALL" which is incorporated by reference herein.

BACKGROUND OF THE INVENTION

1. Field of the Invention

The present invention relates in general to the communications field and, in particular, to a system, intelligent network service engine and method capable of performing real time fraud analysis on an originating side of a call stream to determine whether or not a call is a fraudulent call before the call is connected to a called party.

2. Description of Related Art

Telecommunications fraud is an ever-increasing problem that can be very expensive to communication companies and their customers. Telecommunications fraud can occur in wireline networks, wireless network and Internet networks. For instance, one of the most common telephone fraud schemes occurs when a calling card is stolen, duplicated and distributed to many users. These users then use the stolen calling card to make fraudulent calls. The network operator servicing the calling card eventually becomes aware that the calling card has been stolen and refuses to approve the termination of any calls associated with the stolen calling card. Unfortunately, at this point in time, the costs associated with servicing and terminating all of these fraudulent calls can be very expensive.

Today, telecommunications fraud is typically detected after completion of a fraudulent call by processing network management post event statistics or CDR's (Call Detail Records (billing records)). Generally, the traditional post event fraud processing of a call is done by sending information about the terminated call to a fraud management system which can detect fraudulent attributes and inform an operator about a fraudulent number (or stolen, misused, threatened account) who then manually turns that fraudulent number off at an intelligent network service engine (e.g., service control point, home location register). This process can take 1–48 hours to complete after the termination of the first fraudulent call. Post processing (even very quickly) of call is still performed after a call is terminated which is not desirable since a first fraudulent call can be by itself very expensive. Accordingly, there has been a need for a system, intelligent network service engine and method capable of performing real time fraud analysis on an originating side of a call stream to determine whether or not a call is a fraudulent call before the call is connected to a called party. This need and other needs are satisfied by the system, intelligent network service engine and method of the present invention.

BRIEF DESCRIPTION OF THE INVENTION

The present invention includes a system, intelligent network service engine and method capable of performing real time fraud analysis on an originating side of a call stream to determine whether or not a call is a fraudulent call before the call is connected to a called party. In particular, the system includes a switch, capable of receiving a call originated by a calling party and an intelligent network service engine capable of receiving information (e.g., call origination data) about the call from the switch. The intelligent network service engine (e.g., home location register, service control point, INSight platform) then uses real time fraud management tools to analyze the call origination data to determine whether or not the call has a fraudulent attribute before the call is connected to a called party. The system can be configured as a wired communications network, a wireless communications network and/or an Internet network.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1–5, there are disclosed preferred embodiments of a system 100, intelligent network service engine 102 and method 500 in accordance with the present invention. Although the present invention is described as performing real time fraud analysis on an originating side of a call stream to determine whether or not a call is a fraudulent call, it should be understood that the present invention can also be used to perform real time fraud analysis during a call. Accordingly, the system 100, the intelligent network service engine 102 and the method 500 should not be construed in a limited manner.

Figure 1:
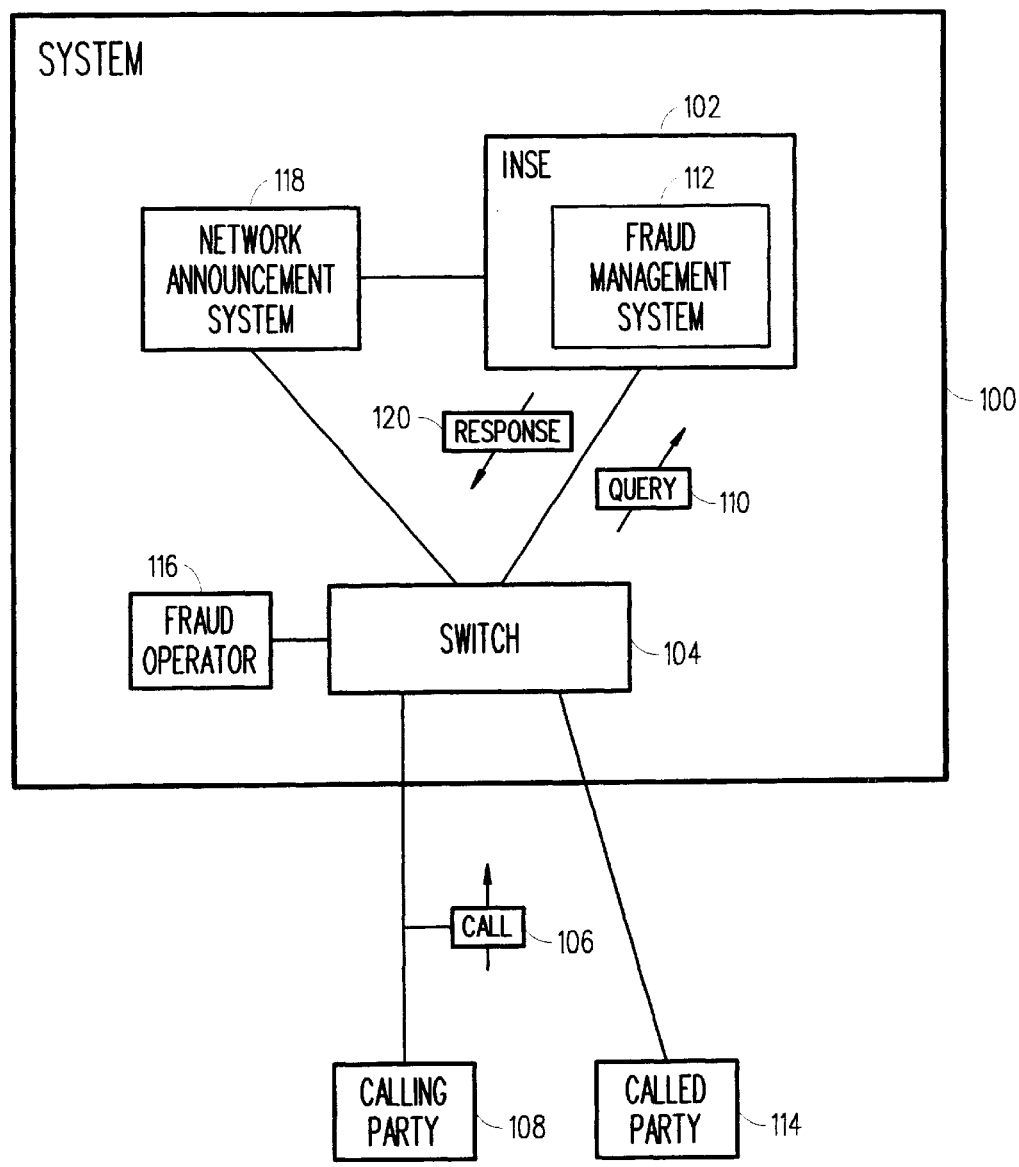
FIG. 1 is a block diagram illustrating the basic components of a system in accordance with the present invention.

Referring to FIG. 1, there is a block diagram illustrating the system 100 which includes the intelligent network service engine (INSE) 102 and a switch 104. Essentially, the switch 104 receives a call 106 originated by a calling party 108 and then forwards a query 110 containing information about the call 106 to the INSE 102. The INSE 102 includes a fraud management system 112 that utilizes real time fraud management tools to analyze the information (e.g., call origination data) within the query 110 and determine whether or not the call 106 has a fraudulent attribute before the call 106 is allowed to be connected to a called party 114.

The fraud management system 112 in determining whether or not the call 106 is a fraudulent call can use real time fraud management tools to compare information in the call origination data to information (e.g., pin number to a calling card) that was previously provided by or stored against a legitimate calling party. Moreover, the fraud management system 112 can determine whether or not the call 106 is a fraudulent call without any previous input from a legitimate call party. For instance, the fraud management system 112 can use the real time fraud management tools to detect a fraudulent call from a mobile phone by determining whether there are any other ongoing calls from the same mobile phone (assume only one call is allowed at a time) The determination that an incoming call 106 can be a fraudulent call or at least a suspected fraudulent call at the origination of a call is very desirable since valuable network resources need not be used to connect a fraudulent call to a called party 114. As such, the fraud management system 112 can even detect an original fraudulent call before terminating that fraudulent call to the called party 114. This is a marked improvement over the state of the art where an original fraudulent call would be terminated to a called party and, then at a later time, the network operator would learn that this call was a fraudulent call and block future fraudulent calls.

The INSE 102 can do a variety of things once an incoming call 106 is determined to be a fraudulent call or at least suspected to be a fraudulent call. For instance, the INSE 102 can forward a response 120 to the switch 104 directing the switch 104 to: (1) block the fraudulent call; (2) forward the fraudulent call to a fraud operator 116; (3) forward the fraudulent call to a network announcement system 118 or at least enable the network announcement system 118 to interact with the calling party 108; or (4) connect the fraudulent call to the called party 114 which would allow the INSE 102 to collect additional information about the ongoing fraudulent call. A more detailed description is provided below about the system 100, the INSE 102 and the various ways the fraud management system 112 can detect a fraudulent attribute in an incoming call 106.

Figure 2:
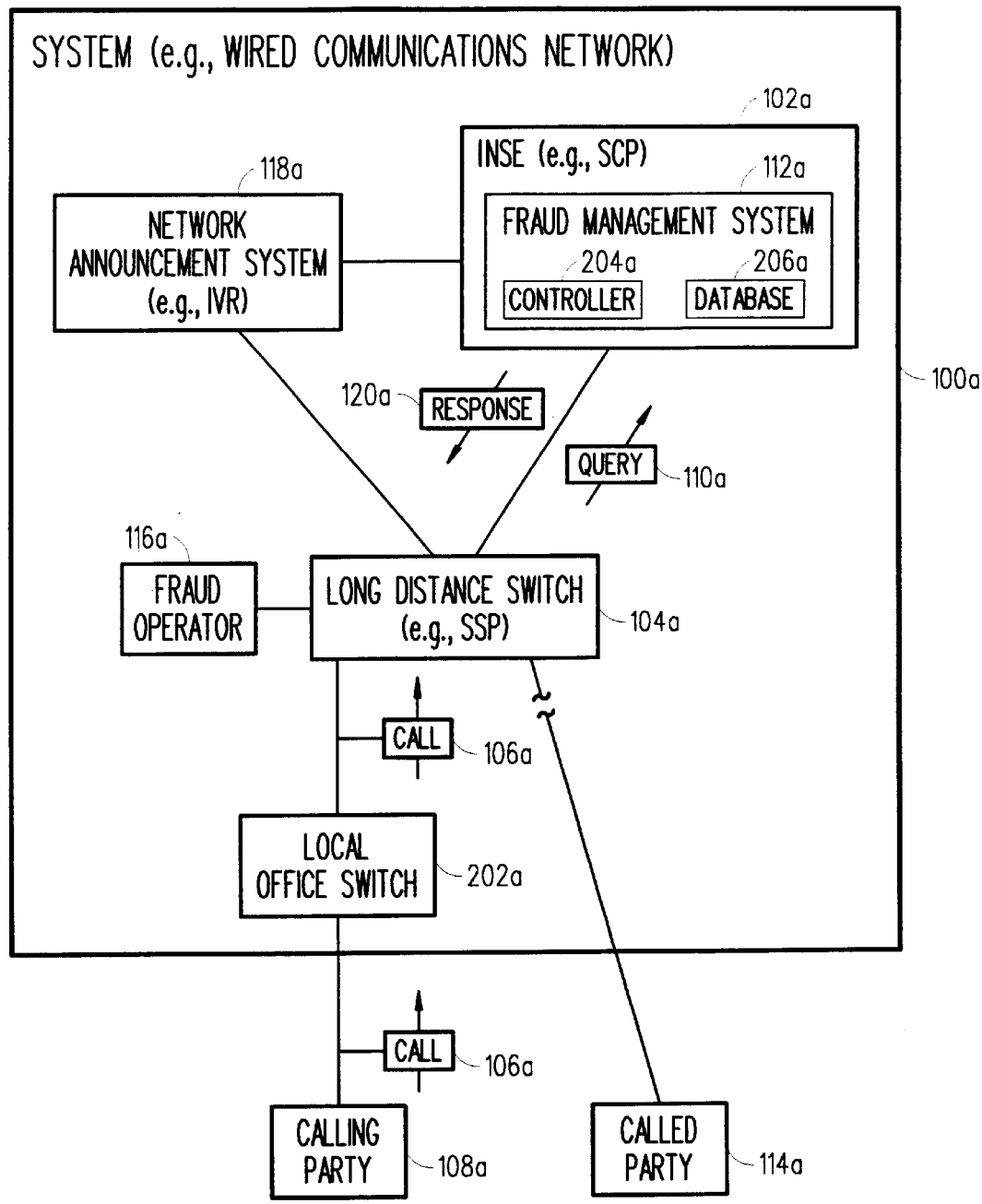
FIG. 2 is a block diagram illustrating in greater detail a first embodiment of the system shown in FIG. 1.

Referring to FIG. 2, there is a block diagram illustrating in greater detail a first embodiment of the system 100. In this embodiment, the system 100 is configured as a wired communications network 100a, the INSE 102 is configured as a service control point (SCP) 102a and the switch 104 is configured as a service switching point (SSP) 104a. For clarity, certain details associated with the system 100a are known in the industry and as such the description provided below in relation to the system 100a omits some components not necessary to understand the present, invention.

The calling party 108a using a land-based phone such as a wired phone or pay phone originates a telephone call 106a towards a local office switch 202a that is managed by a local service provider. The local service provider may not service the call 106a and as such would forward the call 106a to a long distance switch 104a (e.g., service switching point (SSP)). The long distance switch 104a managed by a long distance service provider is programmed to forward information about the telephone call 106a to the SCP 102a. In particular, the long distance switch 104a sends a query 110a to the SCP 102a which contains information (e.g., call origination data) about the telephone call 106a that is analyzed by the fraud management system 112a to determine whether the call 106a is or could be fraudulent call before connecting the call 106a to the called party 114a (shown in the example to be a wired called party). The SCP 102a incorporates the fraud management system 112a which includes a controller 204a and a database 206a.

In one aspect of the present invention, the fraud management system 112a analyzes the origination data associated with the incoming call 106a and information provided earlier by a legitimate calling party to determine whether an incoming call 106a is or could be a fraudulent call. For example, the fraud management system 112a can detect or at least suspect that an incoming calling card call is a fraudulent call when a pin number provided by the calling party 108a does not match a pin number previously provided by a legitimate calling party. In other words, the calling party 108a in order to make a calling card call 106a may have to provide a pin number to the SCP 102a after which the controller 204a would compare that pin number to a pin number provided earlier by a legitimate calling party. The legitimate pin number would normally be stored in the database 206a. If the two pin numbers match, then the fraud management system 112a would allow the switch 104a to connect the call 106a to the called party 114a. Otherwise, if the two pin numbers do not match, then the fraud management system 112a would suspect that the call 106a is a fraudulent call and forward the suspected fraudulent call 106a to a network announcement system 118 (for example). The network announcement system 118 could be configured as an interactive voice response (IVR) system 118a which could request that the calling party 108a provide a correct pin number or other validation information before allowing the call 106a to be connected to the called party 114a.

In another example, the legitimate calling party can provide the fraud management system 112a with guidelines on the acceptable use of their calling card. For instance, the legitimate calling party may only want their calling card to be used to make calls to potential called parties located in specific calling areas associated with telephone area codes 214 and 817. And, if the fraud management system 112a subsequently receives origination data from a calling card call 106a that includes destination information of a called party 114a that is located in a calling area not associated with area codes 214 and 814, then that call 106a may be considered a fraudulent call. Prior to connecting the call 106a to the called party 114a, the fraud management system 112a may forward the suspected fraudulent call 106a to a fraud operator 116a. The fraud operator 116a could interact with and try to obtain validation information from the suspected fraudulent calling party 108a that would enable the call 106a to be connected to the called party 114a if it is a legitimate call (e.g., a call to an area outside of area codes 214 or 817).

Of course, the legitimate calling party can provide the fraud management system 112a with a wide variety of guidelines on the acceptable use of their calling card. For instance, the legitimate calling party may request that the calling card be used to make calls in specific locations, to make calls during certain days or periods of time, or to make a certain number of calls during a certain period of time . . . And, if the fraud management system 112a subsequently receives origination data of a calling card call 106a that contains data conflicts with guidelines, then that call 106a would be suspected of being a fraudulent call.

In another aspect of the present invention, the fraud management system 112a can use real time fraud management tools to determine whether the call 106a is or could be a fraudulent call without any previous input from a legitimate calling party. For example, the fraud management system 112a can detect or at least suspect that an incoming call is a fraudulent call when there is another ongoing call using the same calling card if the number of simultaneous calls exceeds the specified limit. In any case, the fraudulent management system 112a can determine whether an incoming call 106a is fraudulent or suspected to be fraudulent in around 250–500 milliseconds, where 250 milliseconds is the engineering goal and 500 milliseconds is the field survivable worst case.

The fraud management system 112a can do a variety of things once an incoming call 106a is determined to be a fraudulent call or at least suspected to be a fraudulent call. As described above, the fraud management system 112a can forward a response 120a to the SSP 104a directing the SSP 104a to: (1) block the fraudulent call; (2) forward the fraudulent call to a fraud operator 116a; (3) forward the fraudulent call to a network announcement system 118a (e.g., interactive voice response (IVR) system) or at least enable the IVR 118a to interact with the calling party 108a; or (4) connect the fraudulent call to the called party 114a which would allow the fraud management system 114a to collect additional information about the ongoing fraudulent call.

It should be understood that the SSP 104a can perform the same calculations and translations as the SCP 102a to determine whether the telephone call 106a has a fraudulent attribute. But, the SSP 104a typically does not perform complicated calculations and translations, because, a relatively small number of SCPs 102a can be more easily and efficiently programmed with the real time fraud management tools. It should also be understood that the local service provider could also offer the services of the present invention to their customers by enhancing their own switch 202a or SCP (not shown) to include a fraud management system 112a.

Figure 3:
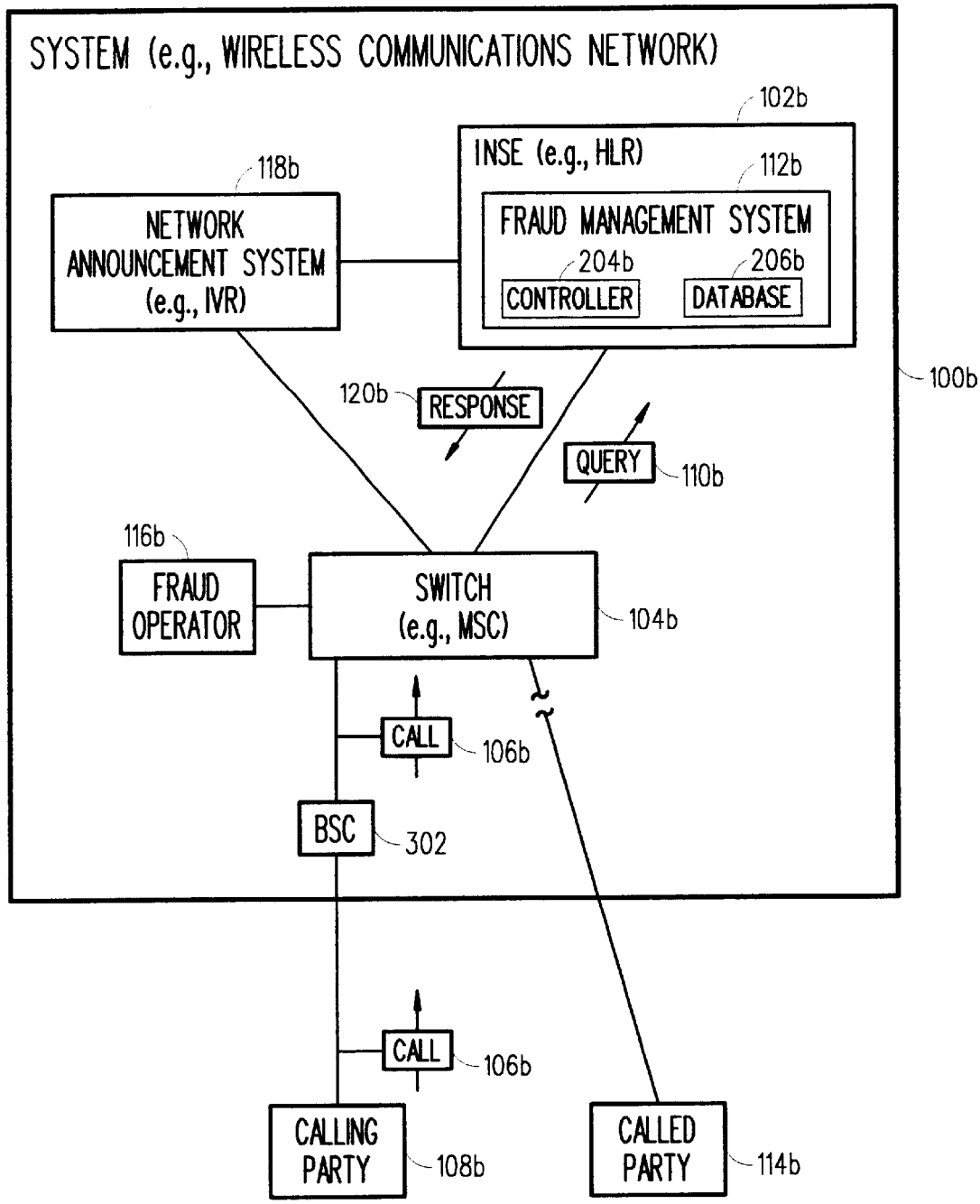
FIG. 3 is a block diagram illustrating in greater detail a second embodiment of the system shown in FIG. 1.

Referring to FIG. 3, there is a block diagram illustrating in greater detail a second embodiment of the system 100. In this embodiment, the system 100 is configured as a wireless communications network 100b, the INSE 102 is configured as a home location register (HLR) 102b and the switch 104 is configured as a mobile switching center (MSC) 104b. For clarity, certain details associated with the system 100b are known in the industry and as such the description provided below in relation to the system 100b omits some components not necessary to understand the present invention.

The calling party 108b uses a mobile phone to originate the telephone call 106b towards a base station controller (BSC) 302b that provides wireless service to mobile subscribers located in one or more cells of the wireless communications network 10b. The BSC 302b then forwards the wireless call 106b to a MSC 104b. The MSC 104b is programmed to forward information about the wireless call 106b to the HLR 102b. In particular, the MSC 104b sends a query 110b to the HLR 102b which contains information (e.g., call origination data) about the wireless call 106b that is analyzed by the fraud management system 112b to determine whether the call 106b is or could be a fraudulent call before connecting the call 106b to the called party 114b (shown in this example to be a wireless called party). The HLR 102b incorporates the fraud management system 112b which includes a controller 204b and a database 206b.

In one aspect of the present invention, the fraud management system 112b analyzes the origination data associated with the incoming wireless call 106b and information provided earlier by a legitimate calling party to determine whether an incoming wireless call 106b is or could be a fraudulent call. In particular, the legitimate calling party can provide the fraud management system 112b with guidelines on the acceptable use of their mobile phone. For instance, the legitimate calling party may provide a guideline that the mobile phone is to be used to originate calls only from a specific geographical area such as Texas. And, if the fraud management system 112b subsequently receives origination data of a wireless call 106b which indicates that the calling party 108b is not La located in Texas, then that call 106b may be considered a fraudulent call. If call 106b is determined to be a fraudulent call, then the fraud management system 112b could instruct the MSC 104b to forward the fraudulent call 106b to a fraud operator 116b (for example). The fraud operator 116b could then interact with and obtain validation information from the calling party 108b that would enable the wireless call 106b to be connected to the called party 114b.

Of course, the legitimate calling party can provide the fraud management system 112b with a wide variety of guidelines on the acceptable use of their mobile phone. For instance, the legitimate calling party may request that the mobile phone be used to make calls from specific locations, to call people in specific locations, to call during certain days or certain periods of time, or to make a certain number of calls in one period of time . . . And, if the fraud management system 112b subsequently receives origination data of a wireless call 106b that contains data that indicates any of these guidelines are not satisfied, then that call 106a would be suspected of being a fraudulent call.

In another aspect of the present invention, the fraud management system 112b can use real time fraud management tools to determine whether the wireless call 106b is or could be a fraudulent call without any previous input from a legitimate calling party. For example, the fraud management system 112b can detect or at least, suspect that an incoming call 106b is a fraudulent call when there already is an ongoing call having the same mobile identification number as the present mobile phone. In other words, one of these calls is fraudulent. If the fraudulent management system 112b detects multiple ongoing wireless calls originating from what appears to be the same mobile phone (e.g., cloned mobile phone), then the fraud management system 112b can simply block the termination of the fraudulent call. Alternatively, the, fraud management system 112b could have the fraudulent call 106b connected to the called party 114b and then collect additional information about the ongoing fraudulent call. The fraud management system 112b could even provide law enforcement personnel with information about the fraudulent call, the fraudulent calling party and the called party.

As above, the fraud management system 112b can do a variety of things once an incoming wireless call 106b is determined to be a fraudulent call or at least suspected to be a fraudulent call. The fraud management system 112b can forward a response 120b to the MSC 104b directing the MSC 104b to: (1) block the fraudulent call; (2) forward the fraudulent call to a fraud operator 116b; (3) forward the fraudulent call to a network announcement system 118b (e.g., interactive voice response (IVR) system) or at least enable the IVR 118b to interact with the calling party 108b; or (4) connect the fraudulent call to the called party 114b which would allow the fraud management system 112b to collect additional information about the ongoing fraudulent call.

In either aspect of the present invention, the fraudulent management system 112a can determine whether an incoming wireless call 106b is fraudulent or suspected to be fraudulent in around 250–500 milliseconds, where 250 milliseconds is the engineering goal and 500 milliseconds is the field survivable worst case. It should also be understood that the MSC 104b can incorporate a fraud management system 112b instead of the HLR 102b.

Figure 4:
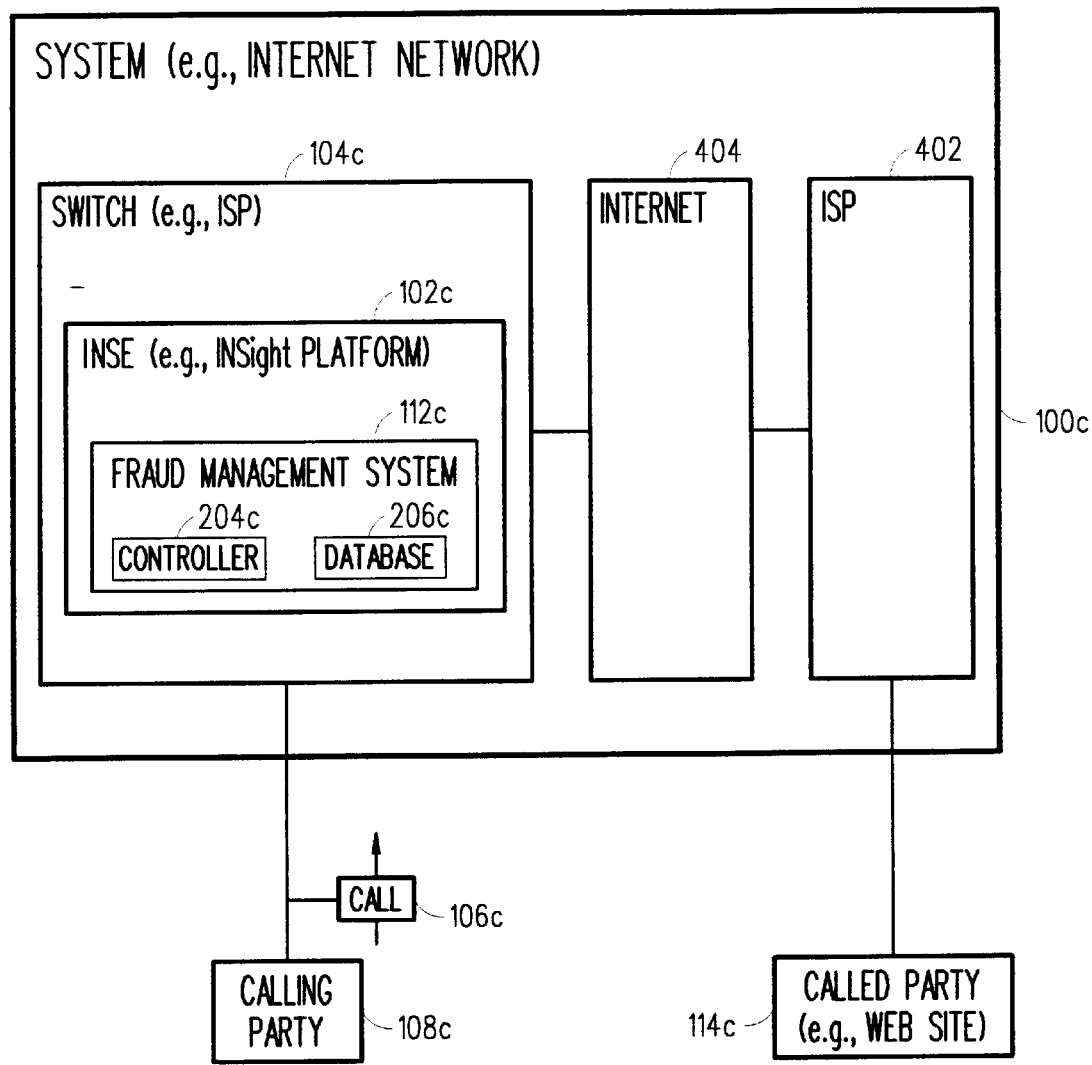
FIG. 4 is a block diagram illustrating in greater detail a third embodiment of the system shown in FIG. 1.

Referring to FIG. 4, there is a block diagram illustrating in greater detail a third embodiment of the system 100. In this embodiment, the system 100 is configured as a Internet network 100c, the INSE 102 is configured as a InSight platform 102c and the switch 104 is configured as an Internet service provider (ISP) 104c. For clarity, certain details associated with the system 100c are known in the industry and as such the description provided below in relation to the system 100c omits some components not necessary to understand the present invention.

The calling party 108c uses a computer (or mobile phone, personal digital assistant . . . ) to originate an Internet call 106c or any Internet related communication towards an ISP 104c that provides Internet service to the calling party 108c. Here, call is used in a broad sense. The ISP 104c then forwards information about the Internet call 106c to the INSight platform 102c. In particular, the ISP 104c sends a query (not shown) to the INSight platform 102c which contains information (e.g., call origination data) about the Internet call 106c that is analyzed by the fraud management system 112c to determine whether the call 106c is or could be a fraudulent call before connecting the Internet call 106c to a called party 114c (e.g., web site). As shown, the called party 114c is serviced by another ISP 402 which is connected to ISP 104c by the Internet 404. The INSight platform 102c incorporates the fraud management system 112c which includes a controller 204c and a database 206c.

In one aspect of the present invention, the fraud management system 112c analyzes the call origination data associated with the incoming Internet call 106c and possibly other data to determine whether the call 106c is or could be a fraudulent call. For an example of fraud prevention applied at the terminating end, the fraud management system 112c can use real time fraud management tools to analyze the call origination data of the Internet call 106c and determine whether this call 106c is just one of many similar Internet calls that may be bombarding a particular web site with queries in an attempt to shutdown that web site. The attacked web site is shown as being associated with the called party 114c. In particular, the fraud management system 112c may determine from the origination data a domain name, an Internet Protocol (IP) address and/or an originating destination that is responsible for the attack on the web site of the called party 114c. Upon determining the existence or possible existence of a fraudulent Internet call 106c, the fraud management system 112c could interact with and direct the ISP 104c to block this and any future fraudulent Internet calls from calling party 108c.

As in the other embodiments, the fraud management system 112c can do a variety of things once an incoming Internet call 106c is determined to be a fraudulent call or at least suspected to be a fraudulent call. For instance, the fraud management system 112b can do the following: (1) block the fraudulent call; (2) forward the fraudulent call to an on-line fraud operator (not shown); (3) forward the fraudulent call to a network announcement system (not shown); or (4) connect the fraudulent call to the called party 114c or destination and then collect additional information about the ongoing fraudulent call.

Figure 5:
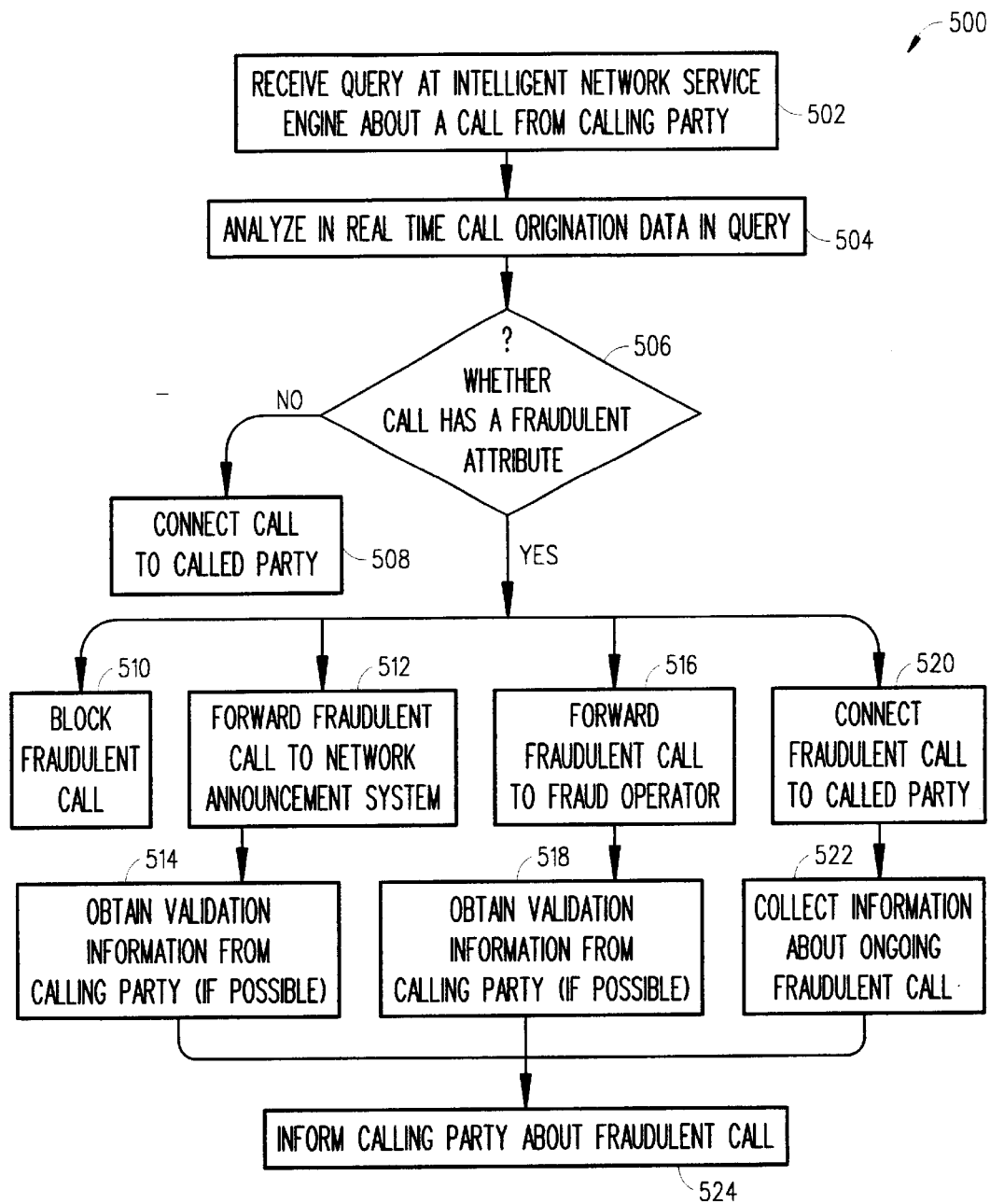
FIG. 5 is a flowchart illustrating the basic steps of a preferred method for detecting a fraudulent call in accordance with the present invention.

Referring to FIG. 5, there is a flowchart illustrating the basic steps of a preferred method 500 for detecting a fraudulent call in accordance with the present invention. Beginning at step 502, the INSE 102 receives a query 110 (e.g., TCAP origination signal) about a call originated by a calling party 108. As described above, the INSE 102 can be configured as a SCP 102a, a HLR 102b and/or an INSight platform 102c. Moreover, the INSE 102 can be known as an Intelligent Network Platform (INP), an Application Server (AS) or as a Software Enabled Advanced Logic Routing Method (SEALRM).

At steps 504 and 506, the INSE 102 uses real time fraud management tools to analyze (step 504) the call origination data associated with the query 110 and determine (step 506) whether the call 106 has a fraudulent attribute prior to connecting the call 106 to the called party 114 or destination. The fraud management tools include at least one fraud analysis algorithm that can operate for around 250–500 milliseconds to determine whether the call 106 has a fraudulent attribute. As such, the fraud management system 112 operates in real time since 250–500 milliseconds is typically the longest duration the INSE 102 would need to complete its other translation work on the incoming call 106. If the call 106 is not a fraudulent call or a suspected fraudulent call, then at step 508, the fraud management system 112 and the INSE 102 instruct the switch 104 to connect the call 106 to the called party 114. Otherwise, if the call 106 is a fraudulent call or a suspected fraudulent call, then the fraud management system 112 can do a variety of things as described below with respect to steps 510–524.

At step 510, the fraud management system 112 can operate to block the fraudulent call 106 or the suspected fraudulent call 106. The blocking of an original fraudulent call 106 is a marked improvement over the state of the art in which an original fraudulent call would normally be terminated to a called party and, then at a later time, the network operator would learn that this call was a fraudulent call and block future fraudulent calls.

At steps 512 and 514, the fraud management system 112 can operate to forward (step 512) the fraudulent call 106 or the suspected fraudulent call 106 to a network announcement system 118. The network announcement system 118 can be configured as an Interactive Voice Response (IVR) system or an IP-SRP which is part of an Intelligent Network. The IVR can use pre-programmed messages to interact with the calling party 108 in an attempt to obtain (step 514) validation information from the calling party 108. If the calling party 108 does not correctly answer the requests from the IVR then the call 106 may be blocked. At steps 516 and 518, the fraud management system 112 can forward (step 516) the fraudulent call 106 or the suspected fraudulent call 106 to a fraud operator 116. The fraud operator 116 can interact with the calling party 108 in an attempt to obtain (step 518) validation information from the calling party 108. If the calling party 108 does not correctly answer the requests of the fraud operator 116 then the call 106 may be blocked.

At steps 520 and 522, the fraud management system 112 could connect (step 520) the fraudulent call 106 to the called part 114 and then collect (step 522) information about the ongoing fraudulent call 106, the calling party 108 and the called party 114. Following is a brief list of the possible data that could be collected by the fraud management system 112:

Source address (IP address, URL, Telephone/Station Number etc . . . )
Destination address (IP address, URL, Telephone Number etc . . . )
Credit card number
Calling card number
Day/Date/Time information
Source geographic information
Destination geographic information
Call duration
Call type
Forwarded to address
Call treatment (at destination)

The fraud management system 112 could even provide law enforcement personnel with information about the fraudulent call, the fraudulent calling party and the called party.

Lastly, at step 524, the fraudulent management system 112 could inform the fraudulent calling party 108 that the fraudulent call 106 or the suspected fraudulent call 106 has been marked as fraudulent and placed on a fraud list. The calling party 108 may also be informed that they should be expecting a call from a fraud operator 116 or should call a specific number to talk with a fraud operator 116 to try and re-instate their call privileges. As shown, step 524 would likely follow steps 514, 518 and 522.

From the foregoing, it can be readily appreciated by those skilled in the art that the present invention provides a system, intelligent network service engine and method capable of performing real time fraud analysis on an originating side of a call stream to determine whether or not a call is a fraudulent call before the call is connected to a called party. As disclosed, the present invention can be implemented within a wired communications network, a wireless communications network and/or an Internet network.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for detecting a fraudulent call, said method comprising the steps of:
   receiving, at an intelligent network service engine, a query about a call originated by a calling party; and
   preventing the connection of the call at least until a determination can be made as to whether the call has a fraudulent attribute, the determination made by using, at the intelligent network service engine, real time fraud management tools to analyze information within the query.

2. The method of claim 1, wherein if the call has a fraudulent attribute then the method further includes the step of blocking the fraudulent call.

3. The method of claim 1, wherein if the call has a fraudulent attribute then the method further Includes the step of forwarding the fraudulent call to a network announcement system.

4. The method of claim 1, wherein if the call has a fraudulent attribute then the method further includes the step of forwarding the fraudulent call to a fraud operator.

5. The method of claim 4, further comprising the step of obtaining validation information from the calling party in response to a request from the fraud operator.

6. The method of claim 1, wherein if the call has a fraudulent attribute then the method further includes the steps of connecting the fraudulent call to the called party and collecting information associated with the ongoing fraudulent call.

7. The method of claim 6, wherein said collected information includes information associated with the calling party and the called party.

8. The method of claim 1, wherein if the call has a fraudulent attribute then the method further includes the step of Informing the calling party about the fraudulent call.

9. The method of claim 1, wherein said intelligent network service engine utilizes information previously received from or stored against a legitimate calling party in determining whether the call has a fraudulent attribute.

10. The method of claim 1, wherein said intelligent network service engine need not use information from a legitimate calling party in determining whether the call has a fraudulent attribute.

11. An intelligent network service engine comprising:
   a fraud management system capable of performing real time fraud analysis on an originating side of a call stream to determine whether a call has a fraudulent attribute and preventing the connection of the call to a called a called party until the determination is complete.

12. The intelligent network service engine of claim 11, wherein said fraud management system includes a controller that uses at least one fraud analysis algorithm to determine whether the call has a fraudulent attribute.

13. The intelligent network service engine of claim 12, wherein said at least one fraud analysis algorithm can operate in less than 500 milliseconds to determine whether the call has a fraudulent attribute.

14. The intelligent network service engine of claim 11, wherein if the call has a fraudulent attribute then said fraud management system is capable of blocking the fraudulent call.

15. The intelligent network service engine of claim 11, wherein if the call has a fraudulent attribute then said fraud management system is capable of forwarding the fraudulent call to a network announcement system.

16. The intelligent network service engine of claim 11, wherein if the call has a fraudulent attribute then said fraud management system is capable of forwarding the fraudulent call to a fraud operator.

17. The intelligent network service engine of claim 11, wherein if the call has a fraudulent attribute then said fraud management system is capable of connecting the fraudulent call to the called party and collecting information associated with the ongoing fraudulent call.

18. The intelligent network service engine of claim 11, wherein if the call has a fraudulent attribute then said fraud management system is capable of informing the calling party about the fraudulent call.

19. The intelligent network service engine of claim 11, wherein said intelligent network service engine is a service control point.

20. The intelligent network service engine of claim 11, wherein said intelligent network service engine is a home location register.

21. The intelligent network service engine of claim 11, wherein said intelligent network service engine is an INSight Platform.

22. The intelligent network service engine of claim 11, wherein if the call has a fraudulent attribute then said fraudulent call can be associated with a stolen calling card or a stolen mobile phone.

23. The intelligent network service engine of claim 11, wherein if the call has a fraudulent attribute then said fraudulent call can be part of a focused overload attack on an Internet web site.

24. A system comprising:
   a switch capable of receiving a call originated by a calling party; and
   an intelligent network service engine capable receiving a query about the call from said switch, and further capable of using real time fraud management tools to analyze information within the query to determine whether the call has a fraudulent attribute and preventing the connection of the call to a called party until the determination is complete.

25. The system of claim 24, wherein if the call has a fraudulent attribute then said intelligent network service engine is capable of blocking the fraudulent call.

26. The system of claim 24, wherein if the call has a fraudulent attribute then said intelligent network service engine is capable of forwarding the fraudulent call to a network announcement system.

27. The system of claim 24, wherein if the call has a fraudulent attribute then said intelligent network service engine is capable of forwarding the fraudulent call to a fraud operator.

28. The system of claim 24, wherein if the call has a fraudulent attribute then said intelligent network service engine is capable of connecting the fraudulent call to the called party and collecting information associated with the ongoing fraudulent call.

29. The system of claim 24, wherein said calling party originates the call using a wired phone, a wireless phone or an Internet device.

30. The system of claim 24, wherein said intelligent network service engine is a service control point.

31. The system of claim 24, wherein said intelligent network service engine is a home location register.

32. The system of claim 24, wherein said intelligent network service engine is an INSight Platform.

33. The system of claim 24, wherein said system is a wireless communications network, a wired communications network or an Internet network.

34. The system of claim 24, wherein said intelligent network service engine utilizes information previously received from or stored against a legitimate calling party in determining whether the call has a fraudulent attribute.

35. The system of claim 24, wherein said intelligent network service engine need not use information from a legitimate calling party in determining whether the call has a fraudulent attribute.

* * * * *